Figure 1:
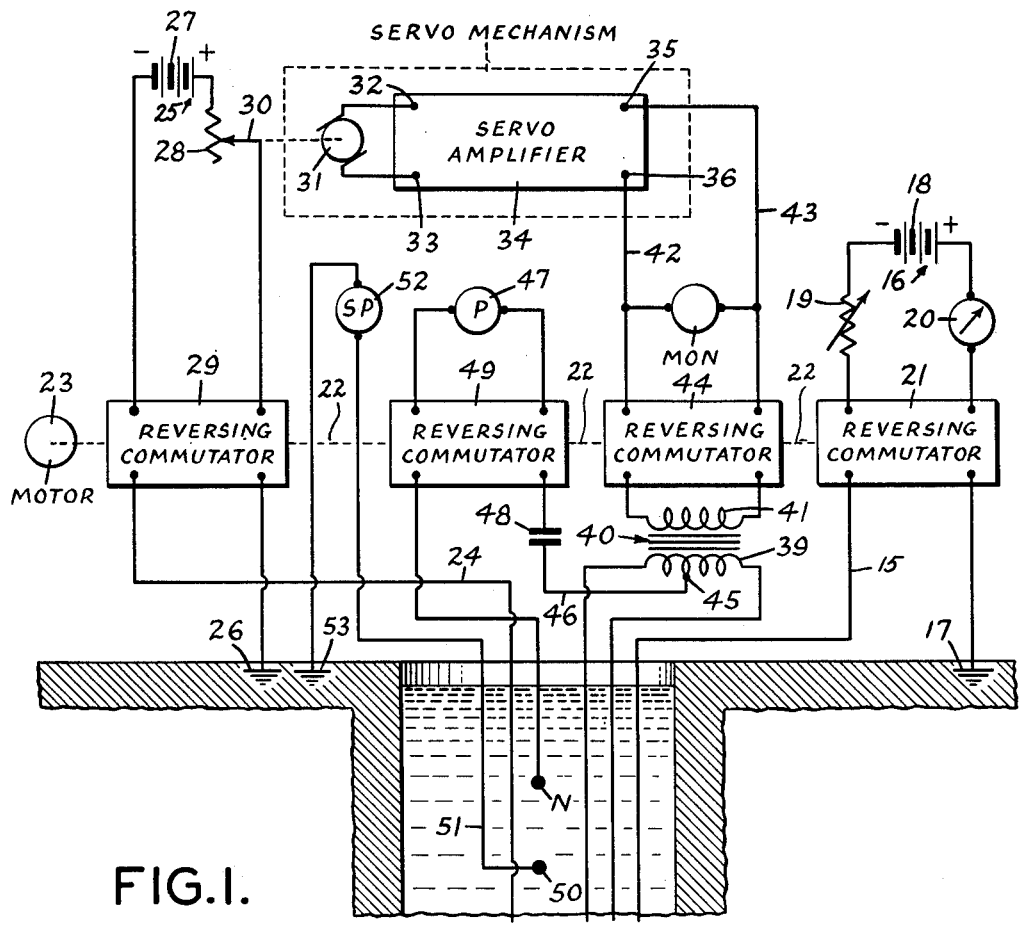

June 26, 1956     G. K. GILLIES     2,752,561
SERVOMECHANISM CONTROL SYSTEM
Filed Sept. 26, 1951     2 Sheets-Sheet 1

INVENTOR.
GEORGE K. GILLIES
BY
Campbell Brumbaugh, Free & Graves
HIS ATTORNEYS.

June 26, 1956 G. K. GILLIES 2,752,561
SERVOMECHANISM CONTROL SYSTEM
Filed Sept. 26, 1951 2 Sheets-Sheet 2

INVENTOR.
GEORGE K. GILLIES
BY
Campbell, Brumbaugh, Free & Graves
HIS ATTORNEYS.

2,752,561
Patented June 26, 1956

United States Patent Office

2,752,561
SERVOMECHANISM CONTROL SYSTEM

George K. Gillies, Houston, Tex., assignor to Schlumberger Well Surveying Corporation, Houston, Tex., a corporation of Delaware Application September 26, 1951, Serial No. 248,384

7 Claims. (Cl. 324—1)

The present invention relates to geophysical exploring systems and the like and more particularly to new and improved systems of this character embodying signal responsive servomechanism apparatus for controlling the electrical energy supplied to the system in a simple and highly effective manner.

In certain geophysical exploring systems that have been devised recently, it is required to control the electric current emitted by one or more electrodes in a bore hole in such fashion as to maintain the potential difference between points spaced apart along the bore hole at a reference value, usually zero. Typical of such systems are the ones disclosed in the copending applications of Henri-Georges Doll, Serial No. 60,872, filed November 19, 1948, now U. S. Patent No. 2,712,626, dated July 5, 1955, for "Selective Spontaneous Potential Well Logging Method and Apparatus," Serial No. 128,191, filed November 18, 1949, now U. S. Patent No. 2,592,125, dated April 8, 1952, for "Method and Apparatus for Logging Static Spontaneous Potentials in Wells," Serial No. 161,641, filed May 12, 1950, now U. S. Patent No. 2,712,627, dated July 5, 1955, for "Electrical Resistivity Well Logging Method and Apparatus," Serial No. 211,788, filed February 19, 1951, now U. S. Patent No. 2,712,628, dated July 5, 1955, for "Electrical Logging Apparatus," and Serial No. 214,273, filed March 7, 1951, now U. S. Patent No. 2,712,629, dated July 5, 1955, for "Electrical Logging of Earth Formations Traversed by a Bore Hole." These applications along with the present application are assigned to a common assignee.

In the several systems disclosed in the applications listed above, electronic amplifier means responsive to signals received from the bore hole apparatus is used to supply current automatically to electrodes in the bore hole to maintain the potential differences between specified points at desired values. While amplifier means of this type is very effective, it is bulky and relatively expensive, and special precautions must be taken to insure stability and to prevent oscillation. Also, since the amplifier output is directly related to the magnitude of the input, there must necessarily be some variation of the input signal in order to produce the different current values that may be needed at different times to maintain the potential differences between the specified points at desired values. As a result, the potential differences cannot be maintained exactly at the desired values, although deviations can be kept to a negligible minimum by using high transconductance amplifier means.

It is an object of the invention, accordingly, to provide new and improved mechanism for controlling the electrical energy supplied to a bore hole which is compact and relatively inexpensive, yet is characterized by flexibility and stability in operation, and by the ability to maintain the potential differences between specified points in the bore hole constant at desired values.

In accordance with the invention, servomechanism responsive to signals received from the bore hole apparatus is used to adjust control means in a power circuit which supplies electric current to electrodes in the bore hole. More specifically, the servomechanism responds to potential differences existing between selected points in the bore hole, and it operates to control the electric current supplied from the power circuit in such fashion as to maintain those potential differences at desired values or substantially at zero.

Figure 2:
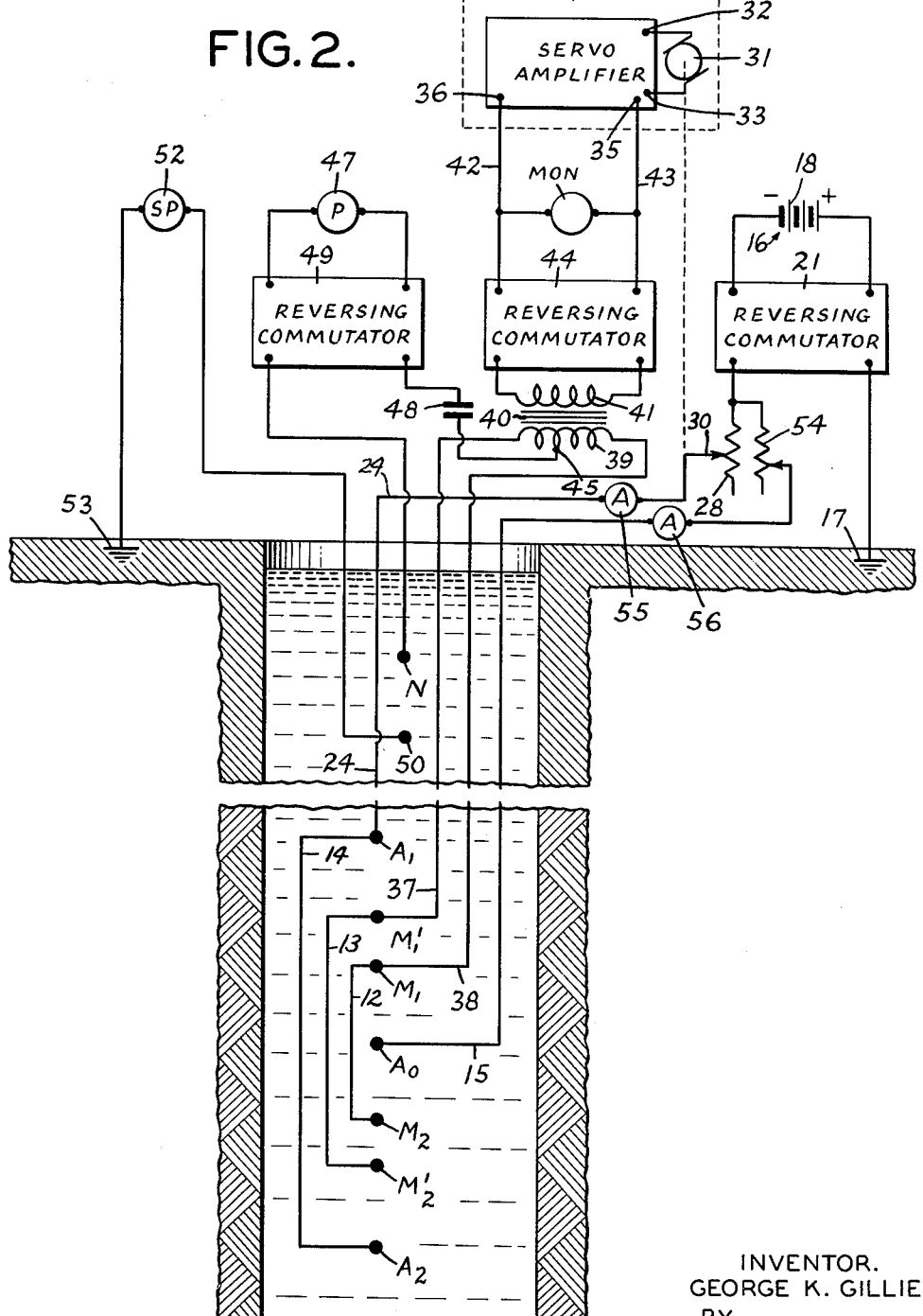

The invention may be better understood from the following detailed description of several typical embodiments thereof, taken in conjunction with the accompanying drawings, in which:

Fig. 1 is a schematic diagram of an electrical resistivity well logging system embodying servomechanism control according to the invention; and Fig. 2 illustrates another embodiment which is simpler in some respects than the form of the invention shown in Fig. 1.

For purposes of illustration, the invention is shown in Figs. 1 and 2 as applied to an electrical logging system of the type shown in the aforementioned application Serial No. 161,641. In a system of this kind a plurality of electrodes $A_1$, $M'_1$, $M_1$, $A_0$, $M_2$, $M'_2$ and $A_2$ are mounted for movement as a unit through a bore hole 10 which usually contains a column of conducting liquid 11. The electrodes $M_1$ and $M_2$ are located equal distances above and below the electrode $A_0$ and are connected together by an insulated conductor 12. The electrodes $M'_1$ and $M'_2$ are disposed equal greater distances above and below the electrode $A_0$ and are connected electrically by an insulated conductor 13. The electrodes $A_1$ and $A_2$ are placed equal still greater distances above and below the electrode $A_0$ and they are connected together by an insulated conductor 14, as shown.

As disclosed in the abovementioned application Serial No. 161,641, highly effective electrical logs can be obtained by supplying substantially constant current to the electrode $A_0$, emitting current from the electrodes $A_1$ and $A_2$ as required to maintain the potential differences between the electrodes $M_1$, $M'_1$ and $M'_2$, $M_2$ substantially at zero, and obtaining indications of potential difference between a point in the vicinity of the electrodes $M'_1$, $M_1$ or $M_2$, $M'_2$, and a point at a reference potential.

Referring again to Fig. 1, current is supplied to the electrode $A_0$ by an insulated electrical conductor 15, the upper end of which is connected to a conventional source of electrical energy 16, the other end of which is grounded at 17. The source 16 may comprise, for example, a battery 18, a rheostat 19 and an ammeter 20 in series, and a conventional commutator 21 on a shaft 22 driven by a motor 23 may be provided for periodically reversing the polarity of the current supplied to the electrode $A_0$.

Current is also supplied to the electrodes $A_1$ and $A_2$ through a conductor 24, the upper end of which is connected in series with another source of electrical energy 25, the other end of which is grounded at 26. The source 25 may comprise, for example, a battery 27 in series with a rheostat 28 and a conventional reversing commutator 29 may be provided for periodically reversing the current fed to the electrodes $A_1$ and $A_2$. The commutator 29 should be like the commutator 21 and it should be mounted on the shaft 22 in such fashion that the current emitted by the electrodes $A_1$ and $A_2$ will tend to oppose the current emitted by the electrode $A_0$.

The rheostat 28 has a movable contact 30 which is adapted to be driven in either direction (to increase or decrease the resistance in series with the battery 27) by a conventional servomoter 31. The servomotor 31 is connected to the output terminals 32 and 33 of a conventional servoamplifier 34, the input terminals 35 and 36 of which are connected to receive the potential difference between the electrodes M'₁ and M₁ in the well, as described below.

The electrodes M'₁ and M₁ are connected by the insulated conductors 37 and 38, respectively, to the primary winding 39 of a transformer 40, the secondary winding 41 of which is connected by the conductors 42 and 43 to the input terminals 36 and 35, respectively, of the servoamplifier 31. Preferably, a reversing commutator 44 is provided for converting the alternating potential difference picked up by the electrodes to a continuous current signal. The commutator 44 may also be mounted on the shaft 22 so that it will operate in synchronism with the commutators 21 and 29.

Indications of electrical resistivity of the earth formations surrounding the bore hole are obtained by observing variations in the potential difference between a point midway between the electrodes M'₁ and M₁ and a remote reference point. This is accomplished by providing a midtap 45 on the primary winding 39 of the transformer 40 and connecting it by a conductor 46 to one terminal of a potential indicating device 47, the other terminal of which may be connected to an electrode N disposed in the bore hole 10 with the other electrodes but at some distance away therefrom.

Preferably, a capacitance 48 should be interposed in the conductor 46 to prevent naturally occurring potentials picked up by the electrodes M'₁ and M₁ from reaching the potential indicating device 47. Also, a reversing commutator 49 is provided for converting the alternating potentials picked up by the electrodes M'₁ and M₁ to continuous current values which are then fed to the indicating device 47. The commutator 49 may be mounted on the shaft 22 so that it may operate in synchronism with the commutators 21, 29 and 44. The potential indicating device 47 will usually be a recording apparatus of the type customarily employed in well logging operations.

If simultaneous indications of spontaneous or naturally occurring potentials are desired, they may be picked up by an electrode 50 disposed in the bore hole 10 with the other electrodes. The electrode 50 may be connected by an insulated conductor 51 to a potential indicating device 52 located at the surface, the other terminal of which is grounded at 53. The potential indicating device 52 is also preferably of the recording type, and it should have a time constant such that it will not respond to periodically varying signals of the same frequency as the currents emitted by the electrodes A₁, A₂ and A₀, but will respond to the spontaneous or naturally occurring potentials.

In operation, the electrodes N, 50, A₁, M'₁, M₁, A₀, M₂, M'₂ and A₂ are moved through the bore hole 10 as a unit while the commutators 21, 29, 44 and 49 are operated in synchronism by the motor 23, the servoamplifier 34 being energized. Under these conditions periodically varying current is emitted by the electrode A₀ which tends to establish potential difference between the electrodes M'₁ and M₁, and M₂ and M'₂. So long as there is any potential difference between the electrodes M'₁ and M₁, the servoamplifier 34 energizes the servomotor 31 which moves the movable contact 30 of the rheostat 28 as required to supply increasing current to the electrodes A₁ and A₂ until substantially zero potential difference obtains. Thus, the servoamplifier 34 and the servomotor 31 continuously maintain the potential difference between the electrodes M'₁ and M₁ (and M₂ and M'₂) substantially zero, so that the readings of the device 47 are accurately representative of the electrical resistivity of the earth formations traversed by the well, as pointed out in the above-noted copending application Serial No. 161,641.

The modification shown in Fig. 2 is somewhat simpler than the form shown in Fig. 1 in that the source of electrical energy 16 supplies electrical energy to both the electrode A₀ and the electrodes A₁ and A₂. This makes it possible to do away with the source of electrical energy 25 and the commutator 29 in Fig. 1. As shown in Fig. 2, this may be accomplished by connecting the rheostat 28 between the conductor 24 and the point where the conductor 15 enters the commutator 21, an adjustable resistance 54 also being interposed between the conductor 15 and the commutator 21. It is also desirable to provide ammeters 55 and 56 in series in the conductors 24 and 15 respectively. This embodiment functions in essentially the same manner as the apparatus shown in Fig. 1.

It will be appreciated from the foregoing description that the invention provides novel and highly effective means for controlling the current supplied to electrical logging apparatus or the like in response to signals received therefrom. By using servomechanism as disclosed herein, the apparatus may be compact and relatively inexpensive yet flexible and stable in operation. Further, since the output current in the servomechanism system is not a function of the amplitude of the input signal but depends on the position of the servomotor, the potential required to move the latter to a new position being essentially constant, the system of the invention enables potential differences between specified points in the bore hole to be maintained constant to a higher degree than has been possible heretofore.

While the invention has been illustrated as applied to a specific form of electrical logging system, obviously it can be utilized in other bore hole systems. For example, the servomechanism current control shown in Fig. 1 can be used effectively in electrical logging systems of the types shown in the aforementioned applications Serial Nos. 60,872, 128,191, 161,641, 211,788 and 214,273, while the control shown in Fig. 2 may be used in systems of the type appearing in said applications Serial Nos. 211,788 and 214,273.

The several embodiments described in detail herein are obviously susceptible of modification within the spirit of the invention. For example, a conventional potentiometer may be used in place of the rheostat 28. Also, the intensity of the current fed to the electrodes A₁ and A₂ may be adjusted by interposing a rheostat, a conventional resistance potentiometer, or an autotransfomer between the commutator 29 in Fig. 1 or the commutator 21 in Fig. 2 and the conductor 24. It is also possible to use conventional alternators for sources of power, and conventional electronic rectifiers instead of reversing commutators for converting the periodically varying potential differences picked up to continuous current values. The invention, therefore, is not to be limited save as defined in the following claims.

I claim:

1. In an electrical logging system, the combination of at least two current emitting electrodes and two potential pickup electrodes mounted for movement through a bore hole in longitudinally spaced apart relation with respect to the axis of the bore hole, a source of electrical energy connected to one of said current emitting electrodes and to a relatively remote reference point, an adjustable source of electrical energy connected to the other of said current emitting electrodes and to a relatively remote reference point, servomotor means for controlling the adjustment of said adjustable source, servoamplifier means responsive to the potential difference between said two potential pickup electrodes for energizing said servomotor means to cause current to be emitted from said other current emitting electrode to reduce said potential difference substantially to zero, and means for providing indications of potential difference between a point at a location where the potential gradient attributable to the currents supplied to said two current emitting electrodes is substantially zero, and a relatively remote reference point.

2. In an electrical logging system, the combination of an electrode array comprising a central current emitting electrode, two pairs of longitudinally spaced apart potential pickup electrodes disposed symmetrically above and below said central electrode, the inner pickup electrodes being electrically connected and the outer pickup electrodes being electrically connected, and two electrically connected auxiliary current emitting electrodes placed symmetrically above and below said central electrode and outside of said pickup electrodes, a source of electrical energy connected to said central current emitting electrode and to a relatively remote reference point, an adjustable source of electrical energy connected to said auxiliary current electrodes and to a relatively remote reference point, servomotor means for controlling the adjustment of said adjustable source, servoamplifier means responsive to the potential differences between the electrically connected pickup electrodes comprising said two pairs for energizing said servomotor means to cause current to be emitted from said auxiliary current electrodes to reduce said potential differences substantially to zero, and means for providing indications of potential difference between a point intermediate the two electrodes comprising one of said pairs of pickup electrodes and a relatively remote reference point.

3. In an electrical logging system, the combination of at last two current emitting electrodes and two potential pickup electrodes mounted for movement through a bore hole in fixed longitudinally spaced apart relation with respect to each other and to the axis of the bore hole, a source of electrical energy, means for supplying substantially constant current from said source to one of said current emitting electrodes, adjustable means for supplying variable current from said source to the other of said current emitting electrodes, servomotor means for controlling the adjustment of said adjustable means, servoamplifier means responsive to the potential difference between said two pickup electrodes for energizing said servomotor means to cause current to be emitted from said other current emitting electrode to reduce said potential difference substantially to zero and means for providing indications of potential difference between a point in the vicinity of said potential pickup electrodes and a relatively remote reference point.

4. In an electrical logging system, the combination of at least two current emitting electrodes and two potential pickup electrodes mounted for movement through a bore hole in fixed longitudinally spaced apart relation with respect to each other and to the axis of the bore hole, a first source of continuous current connected to one of said current emitting electrodes and to a relatively remote reference point, first commutator means for periodically reversing the connections between said source and said one current electrode and reference point, a second source of continuous current connected to the other of said current emitting electrodes and to a relatively remote reference point, second commutator means operated in synchronism with said first commutator means for periodically reversing the connections between said second source and said other current electrode and reference point, adjustable impedance means interposed in the circuit of said second source for adjusting the intensity of the current supplied to said second current electrode, servomotor means for controlling the adjustment of said adjustable impedance means, servoamplifier means responsive to the potential difference between said two potential pickup electrodes for energizing said servoamplifier means, and means for providing indications of potential difference between a point in the vicinity of said two potential pickup electrodes and a relatively remote reference point.

5. In an electrical logging system, the combination of at least two current emitting electrodes and two potential pickup electrodes mounted for movement through a bore hole in fixed longitudinally spaced apart relation with respect to each other and to the axis of the bore hole, a source of continuous current, commutator means for converting continuous current from said source to periodically varying current, means for supplying periodically varying current of substantially constant intensity from said source and commutator means to one of said current emitting electrodes, adjustable impedance means for supplying periodically varying current of varying intensity from said source and commutator means to the other of said current emitting electrodes, servomotor means for controlling the adjustment of said adjustable impedance means, servoamplifier means responsive to the potential difference between said two potential pickup electrodes for energizing said servoamplifier means, and means for providing indications of potential difference between a point in the vicinity of said two pickup potential electrodes and a relatively remote reference pont.

6. In an electrical system for investigating a conducting medium having an electric current flowing therein, the combination of two spaced-apart potential pickup electrodes disposed in electrical conducting relation with respect to said medium so as to pick up a first potential difference produced in said medium by said current flowing therein, an energizing circuit including an adjustable source of electrical energy disposed in electrical conducting relation with respect to said medium so as to produce a second potential difference between said potential pickup electrodes of opposite polarity to said first potential difference, servomotor means for controlling the adjustment of said source, and servoamplifier means responsive to the resultant potential difference between said potential pickup electrodes for energizing said servomotor means to effect adjustment of said source so as to maintain said resultant potential difference substantially at a reference value.

7. In an electrical logging system for investigating a conducting medium traversed by a bore hole, said medium having a current flowing therethrough, the combination of at least two potential pickup electrodes mounted for movement through the bore hole in fixed longitudinally spaced-apart relation with respect to each other and to the axis of the bore hole, said two potential pickup electrodes being disposed in electrical conducting relation with respect to said medium so as to pick up a first potential difference produced in said medium by said current flowing therein, an energizing circuit including an adjustable source of electrical energy disposed in electrical conducting relation with respect to said medium so as to produce a second potential difference between said potential pickup electrodes of opposite polarity to said first potential difference, servomotor means for controlling the adjustment of said source, and servoamplifier means responsive to the resulting potential difference between said potential pickup electrodes for energizing said servomotor means so as to maintain said resultant potential difference substantially at a reference value.

No references cited.